United States Patent [19]

Schuman

[11] 3,836,255

[45] Sept. 17, 1974

[54] SPECTROMETRIC SUBSTANCE ANALYZER EMPLOYING TEMPERATURE MODULATION

[76] Inventor: Mark Schuman, 101 G. St., S.W. Apt. 516, Washington, D.C. 20024

[22] Filed: Dec. 29, 1972

[21] Appl. No.: 319,729

Related U.S. Application Data

[63] Continuation-in-part of Ser. No. 241,742, April 6, 1972.

[52] U.S. Cl..................... 356/85, 250/343, 250/351, 356/51
[51] Int. Cl........................ G01j 3/30, G01n 21/34
[58] Field of Search.......... 356/51, 85, 97; 250/343, 250/351, 352

[56] References Cited
UNITED STATES PATENTS
3,516,745  6/1970  Schuman ............................. 356/85

*Primary Examiner*—Vincent P. McGraw
*Attorney, Agent, or Firm*—Lowe, King and Price

[57] ABSTRACT

A spectrometric substance analyzer includes an optical chamber containing fluid that is cyclically temperature modulated at substantially constant pressure. The fluid is supplied via recirculating circuits to the chamber from hot and cold sources that are cyclically connected to the chamber so that at any time only one of the sources is in recirculating fluid flow relationship with the chamber.

70 Claims, 1 Drawing Figure

SPECTROMETRIC SUBSTANCE ANALYZER EMPLOYING TEMPERATURE MODULATION

RELATION TO CO-PENDING APPLICATION

The present application is a continuation-in-part of my co-pending application entitled "Oscillating Bellows," filed Apr. 6, 1972, Ser. No. 241,742.

FIELD OF INVENTION

The present invention relates generally to spectrometric substance analyzers and more particularly to a spectrometric substance analyzer wherein a fluid in an optical chamber is cyclically heated and cooled to produce a characteristic spectral radiance variation in response to a substance of interest in the fluid.

BACKGROUND OF THE INVENTION

Spectrometric substance analyzers utilizing a pumping or pressurizing technique for modulating the pressure and temperature of a fluid in an optical chamber inherently have simplicity, low system output drift and, with the proper design, such as non-dispersive filtering techniques, can have high sensitivity and good selectivity. However, performance is frequently degraded by vibration and wear, as well as electrical, pneumatic, and audible noise, associated with pump and valve mechanisms of the analyzers. Furthermore, these analyzers typically utilize in the chamber a fluid (usually a gas) that provides either modulated radiant emission in the middle and near infrared or modulated absorption of energy from a radiant source in the near infrared, visible or ultraviolet regions of the electromagnetic spectrum; generally they do not utilize both modulated emission and modulated absorption.

I have discovered that if one attempts to cover a broader spectral region by combining emission and absorption monitoring using a single optical chamber of a pumping type spectrometric analyzer, there is a borderline region of the near and middle infrared, around say, 3 to 13 microns, depending on analyzer design, where the emission and absorption radiances typically tend to cancel each other to a variable degree depending on wavelength and design, so that analyzer sensitivity in this borderline region of the typical emission and absorption portions of the spectrum is reduced and can even be zero at a given wavelength. The cancelling occurs because increasing the pressure of the fluid in the optical chamber increases fluid concentration and temperature; the concentration increase causes an increase in absorption but the concentration and temperature increases cause a simultaneous increase in emission. Since the emission and absorption signals are in phase but of opposite polarity, they tend to cancel each other, i.e., they subtract from each other rather than add to each other. The cancellation effect appears to preclude practical use of prior art pump analyzers in a significant portion of a region of the spectrum useful for identifying and monitoring the concentration of molecular species. In a complex gas mixture, spectral interference is sometimes present but can generally be reduced or avoided by monitoring one or more characteristic bands which are relatively free from interference. However, if a spectrometer has a limited spectral region in which to choose preferred bands, the selectivity, i.e., specificity to a particular species in a complex gaseous mixture, is often limited, as is the ability to detect both short wavelength absorbing substances and long wavelength emitting substances. Thus prior art spectrometric pump type analyzers utilizing only a portion of the useable infrared spectrum are limited in reliability, as well as versatility.

If the radiant source is eliminated, the emission signal is not cancelled in the borderline region, but the shorter wavelengths at which emission is negligible cannot be monitored. Correspondingly, if the radiant source is very strong to override the cancelling effect of the emission signals in the borderline region, the device becomes less practical and the borderline region shifts a few microns toward longer wavelengths, thereby significantly reducing sensitivity in the middle infrared. In any of the three cases of a strong, medium or no radiant source, a portion of the spectral region is given up and cannot be used for monitoring characteristic bands of gases of interest.

If, to combat this cancelling problem, an emission analyzer operating at the longer wavelengths is coupled with an absorption analyzer having a radiant source and operating at shorter wavelengths, the resulting system is increased in size, complexity, and cost. Furthermore, from the standpoint of monitoring two or more gases of interest or correlating two or more bands of a gas of interest to improve selectivity and reliability, it is generally preferable to monitor all of the bands in the same optical chamber, because of greater uniformity of conditions.

If, as still another alternative attempt to combat the emission and absorption cancelling problem, a single optical chamber were used and a strong radiant source were operated periodically to provide sequential emission and absorption monitoring, a duty cycle of less than unity would result to degrade sensitivity and increase complexity.

Thus, it appears that while pump type spectrometric fluid analyzers utilizing non-dispersive infrared filtering are often simple, compact, rugged, sensitive and reasonably selective and versatile, a modified approach is needed to solve the cancelling problem and broaden the spectral region to obtain greater selectivity and versatility, and to reduce vibration, noise, and wear introduced by pump and valve mechanisms.

BRIEF DESCRIPTION OF THE INVENTION

In accordance with the present invention, a substance emission and absorption analyzer is provided wherein cancellation of the emission and absorption radiances in the borderline spectral region of significant spectral emission and absorption does not occur since a fluid is circulated at substantially constant pressure in a substantially constant volume optical chamber. The constant pressure fluid is alternately heated and cooled to provide in phase, additive modulation of its emission and absorption radiances.

To these and other ends, fluid alternately and repeatedly circulates in a hot fluid circuit containing a heating chamber and the optical chamber and a cold fluid circuit containing a cooling chamber and the optical chamber. When the hot fluid circuit is in recirculating fluid flow relationship with the optical chamber, fluid is heated and hot fluid circulates through the optical chamber. Similarly, when the cold fluid circuit is activated, fluid is being cooled and cool fluid circulates through the optical chamber. Terms such as hot, cool and cold, as used herein, are relative only. Thus, for example, a substance which is cool or cold has a temperature lower than that of a hot substance, even though the "cool" or "cold" substance may seem warm or hot to the touch. Inlet and outlet conduits are provided for feeding fluid from a substantially constant pressure source, which is maintained in fluid flow relation with the two circuits, to stabilize the pressure within the system to a substantially constant value during at least a significant portion of the heating and cooling cycle. Pressure stabilization is provided by permitting expansion and contraction of the fluid being heated and cooled. The term fluid as used herein means any fluid medium such as a gas, liquid, plasma, aerosol, suspension or some combination of these, and thus may include some solid material.

The resulting modulation of the temperature of a compressible or evaporable fluid in the optical chamber at relatively constant pressure causes a modulation of the concentration or density or amount of fluid in the optical chamber because of the expansion of fluid from and contraction of fluid into the optical chamber during heating and cooling. The concentration modulation is approximately 180° out of phase with the temperature modulation. Thus the heating of the fluid at constant pressure causes an expansion of fluid from the optical chamber which lessens the amount, concentration, or density of the fluid in the optical chamber, and therefore also lessens, in general, the spectral absorption by the fluid of radiant energy emitted into the chamber by a radiant source. (One possible exception to this is in the rare case of a "hot" band where the absorption coefficient increases markedly with temperature). Simultaneously, spectral radiant emission (net emission equal to emission minus self-absorption) at wavelengths of interest by the fluid within the optical chamber increases as a result of the heating because of a substantially greater positive effect of the increasing temperature on emission than the negative effect on emission of the decreasing concentration. For low concentrations of a constituent in the optical chamber, the spectral radiance variation in the optical chamber resulting from emission by the gas is proportional to the first power of the concentration, while the radiant emission in a typical band of the substance increases with temperature at a rate substantially faster than the first power of temperature. Since at constant pressure the fractional decrease in concentration is equal to the fractional increase in temperature, the temperature effect on radiant emission is dominant over the concentration effect on radiant emission and radiant emission increases substantially with increasing temperature even though concentration is decreasing. At higher concentrations, because of stronger self-absorption by the constituent, the temperature effect is even more dominant since the amplitude of radiance variation from emission varies with concentration even less rapidly than as the first power of concentration. On the other hand, in a typical band, the fractional absorption by the gas of energy from a radiant source, while also being proportional to concentration at low concentrations and varying less rapidly with concentration at higher concentrations, is relatively independent of temperature or, if thermal depopulation of the ground or lower state is significant, the fractional absorption may actually decrease slightly with increasing temperature.

Thus, in contrast to prior pump type spectrometric, gas analyzers, the net emission by the gas in a typical band increases while the absorption by the gas of radiant energy from an external source decreases as temperature is increased and concentration decreased at constant pressure. Thereby, the variation in spectral radiance in the chamber caused by the modulated (net) emission by the gas and modulated absorption by the gas of energy from a radiant source are substantially additive, to reinforce each other rather than tending to cancel each other in the borderline region in the near or middle infrared. Relatively high sensitivity can thereby be obtained in the borderline spectral region to enable analysis with a single instrument and optical chamber throughout a broad spectral region, which may include the infrared, visible, and ultraviolet. This broad spectral coverage, by allowing separate spectrometric analyses at different wavelengths to be made and correlated with each other, also facilitates high selectivity or specificity and therefore provides high reliability of the concentration measurement. Also, vibration, wear, complexity, malfunctions, and noise associated with the valve and pumping mechanisms are substantially reduced or eliminated by having a small number of mechanical moving parts and/or by using rotary motion.

The varying spectral radiance in a given spectral band or region may be sensed by a pair of radiant detector flakes after passing through dual spectral filters to obtain a differential signal corresponding to the spectral signature of interest. Alternatively, a selective pneumatic detector may be used, e.g., as disclosed in U.S. Pat. No. 2,924,713. The resulting electrical signal is filtered, amplified, synchronously rectified, and then smoothed by means such as an RC filter, to integrate the rectified signal over a number of cycles, in order to improve the signal to noise ratio and therefore sensitivity. For low concentrations the amplitude of the smoothed d.c. signal is proportional to substance concentration. The optical chamber is made reflective on its inside surface to conserve radiation and increase the effective optical path length, for greater sensitivity. Additional filter and detector pairs can be added to monitor additional bands or spectral regions and enable correlations to be made between spectral energy at various wavelengths to qualitatively and quantitatively identify substances in the mixture.

Fins can be added to the housing of the radiant source to enable it to serve as heating chamber for fluid flowing in the hot loop, so that waste heat from the radiant source can be used as the primary means for heating the fluid. Correspondingly, the transfer of heat to the fluid can serve as the primary means for cooling the housing of an arc lamp or other radiant source. Also, heat from the source increases the temperature and infrared emission of the optical chamber walls, thereby improving sensitivity.

In a modification of this invention, a second valve is added to block the expansion of fluid out of the optical chamber during a portion of the time while the hot circuit is activated, so that fluid is heated at relatively constant volume and increasing pressure for a small part of the cycle. Emission during this small portion of the cycle is increased with a sacrifice in the drop in absorption radiance. During the remainder of the heating cycle, pressure is released and reduced to a constant value and radiant absorption is decreased. The subsequent cooling portion of the cycle, at constant pressure, increases concentration and absorption. Thereby, dominant absorption and/or emission radiances can be effectively monitored during partially separate portions of the cycle.

This invention can be used to monitor any substantial variation in spectral emission or absorption by a substance in the optical chamber in response to its changing temperature or concentration, i.e., density or amount, in the optical chamber. The substance may be in any physical state, such as gas, vapor, liquid, or solid, or any combination of these, but a fluid medium is required for temperature modulation. If the fluid is non-compressible and non-evaporable, the fluid concentration in the optical chamber is essentially constant and the characteristic radiance variation in the chamber is mainly due to a variation in emission of the fluid or other substance in the chamber as a result of the thermal cycling of the fluid.

It is, accordingly, an object of the present invention to provide a new and improved spectrometric substance analyzer.

It is another object of the invention to provide a new and improved spectrometric fluid analyzer.

An additional object is to provide a new and improved spectrometric fluid analyzer having high sensitivity over a broad spectral region.

A further object is to provide a new and improved, reliable spectrometric substance analyzer having a relatively high selectivity to a particular substance.

Another object of the present invention is to provide a new and improved spectrometric substance analyzer of simple, compact and rugged design and capable of sensitive and selective monitoring, over a long period of time, of the concentrations of a number of substances.

Still another object is to provide a new and improved spectrometric substance emission and absorption analyzer utilizing a single optical chamber.

A further object is to provide a new and improved spectrometric fluid analyzer having a simple, reliable, and relatively noise free means for cyclically varying the temperature of a substance in an optical chamber at substantially constant pressure and at a frequency substantially independent of properties of the fluid.

An additional object of the invention is to periodically, reliably, rapidly, and quietly vary, at relatively constant pressure, the temperature of fluid in a fixed volume optical chamber by a novel fluid recirculation means which minimizes wasteful mixing or exhausting of hot and cool fluid while providing sufficient mixing and sampling for maintaining in the optical chamber a representative and current sample of an external fluid being analyzed.

A still further object is to provide a new and improved spectrometric fluid analyzer having a simple and reliable means for modulating, at a frequency substantially independent of the properties of the fluid, the temperature and concentration of the fluid in an optical chamber such that the temperature and concentration variations are substantially one half cycle out of phase with each other.

A further object of the invention is to provide a new and improved spectrometric substance analyzer having practical means for alternately and rapidly inducing a substantial flow of hot and cool fluid through an optical chamber.

Still another object is to provide a new and improved spectrometric substance analyzer wherein periodic emission and periodic absorption by a substance in a typical absorption band of the substance are phased so that they tend to reinforce and augment each other substantially according to the laws of numerical addition, rather than tending to cancel each other.

Another object is to provide a new and improved spectrometric substance analyzer capable of analyzing a mixture in one or more portions of the spectrum and correlating the spectral energy monitored at various wavelengths to enable qualitative and quantitative identification of substances in the mixture.

A still further object is to provide a new and improved spectrometric analyzer of a constituent of a compressible or evaporable fluid medium including means for alternately modulating at substantially constant volume and at substantially constant pressure the temperature of a sample of the fluid medium.

An additional object is to provide a new and improved spectrometric fluid analyzer having means operated relatively independently of the properties of a fluid for varying at substantially constant pressure and relatively large amplitude the temperature of fluid in a fixed volume optical chamber, and means synchronized to the temperature variation for monitoring characteristic radiance variations in the chamber.

Another object of the present invention is to provide a new and improved spectrometric substance analyzer having a means for rapidly heating and cooling fluid in an optical chamber at a constant cyclical frequency while allowing fluid being heated to expand and allowing fluid being cooled to contract, for sensitive and selective analysis.

A further object is to provide periodic characteristic spectral emission and absorption by a known substance for use in substance analysis, wherein the emission and absorption variations are sufficiently out of phase to reinforce each other in a typical radiant band of the substance.

Another object of the invention is to provide a practical means for modulating a physical property of a substance to facilitate qualitative and quantitative spectrometric identification of the substance.

The above and still further objects, features, and advantages of the present invention will become apparent upon consideration of the following detailed description of one specific embodiment thereof, especially when taken in conjunction with the accompanying drawing.

DETAILED DESCRIPTION OF THE DRAWING

Figure 1:
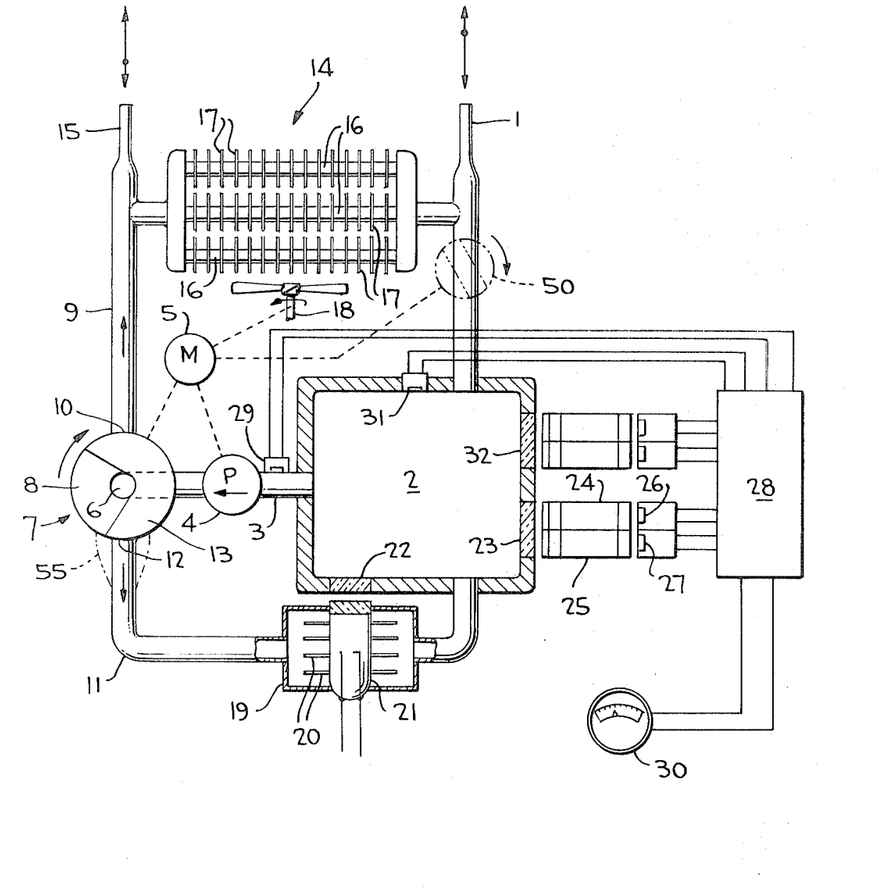
The single FIGURE is a schematic illustration of the invention.

Reference is now made to the FIGURE wherein there is illustrated a fluid inlet conduit 1 for supplying a mass of fluid from a large volume source, such as the atmosphere, to reflective, random path, fixed volume, optical chamber 2 having walls that are impervious to fluid flow through them. Chamber 2 includes an outlet port leading to common conduit 3 that alternately carries both hot and cool masses of fluid from the optical chamber to provide cyclic temperature, and therefore concentration, modulation of the fluid in the chamber. Fluid is drawn from chamber 2 by pump 4 that is located in conduit 3 and driven by motor 5. The fluid flows to inlet 6 of rotary distributor valve 7 also driven by motor 5. Motor 5 is preferably a synchronous motor, whereby valve 7 is operated independently of properties of the fluid. Valve 7 has a cut-out portion 8 which alternately distributes fluid from common conduit 3 to a cold conduit 9 via distributor valve outlet port 10 and a hot conduit 11 via valve outlet port 12 as body 13 of valve 7 is rotated clockwise at a uniform rate by motor 5. When the cold conduit 9 is connected to chamber 2 the hot conduit is blocked and vice versa. In the valve position illustrated, both valve outlet ports are momentarily blocked and there is no substantial fluid flow during this very small fraction of a cycle. This illustrates a "break before make" fluid switching design.

After valve body 13 has rotated a few degrees clockwise, fluid is distributed through port 10 to cold conduit 9, cooling chamber 14, and thence in a recirculating fluid flow path back to optical chamber 2 via a portion of inlet conduit 1. Because of the pressure differential introduced by pump 4, fluid flows continuously in this cooling circuit during this portion of the cycle, with a small flow of fluid into the system through inlet 1 and out of the system through outlet 15 via cold conduit 9. The inlet and outlet flows provide sampling of fluid from an external source for analysis. Cooling chamber 14 comprises cooling conduits 16 having external cooling fins 17, cooled by air flow from fan 18 which may also be driven by motor 5.

As body 13 of valve 7 continues to rotate, port 10 is again blocked, thereby deactivating the cold, or cooling, recirculation circuit and again momentarily blocking substantial fluid flow through optical chamber 2 by blocking flow in both a heating circuit described below and in the cooling circuit. This optional "break before make" operation of distributor valve 7 may be desirable to allow monitoring of radiance in optical chamber 2 during conditions of substantially no flow, instead of or in addition to monitoring radiance during heating and/or cooling, in order to minimize thermal, or other noise during monitoring, or to improve the waveshape or amplitude of the radiance modulation, or for other reasons.

As body 13 of distributor valve 7 rotates still further, port 12 is unblocked and fluid is circulated in a hot, or heating, recirculation circuit comprising, in order, optical chamber 2, common conduit 3, valve 7 and its port 12, and hot conduit 11 containing heating chamber 19 and leading back to chamber 2. Heating chamber 19 is located in conduit 11 and comprises heating fins 20 that are mounted on radiant source 21, which may be an arc or spectral lamp. Heat exchange fins 20 transfer waste heat from source 21 to fluid flowing in conduit 11, whereby the lamp is cooled by the flowing fluid. During this portion of the cycle that the hot recirculation circuit or loop is activated, fluid being heated flows continuously through the components of the heating circuit, including those components which are common to both the cool and the hot recirculation circuits; namely, optical chamber 2, conduit 3, pump 4, and valve 7. As valve 7 rotates further, the heating and the cooling flow in both circuits is again blocked and the cycle is completed.

Thus, at substantially constant pressure, a cool mass of fluid is forced into optical chamber 2 while withdrawing a mass of fluid from the optical chamber and thereafter a mass of heated fluid is forced into the chamber while withdrawing a mass of fluid, and this cycle is repeated periodically. In other words, a means is provided for repeatedly or cyclically replacing part or all of the hot fluid in the optical chamber with cool fluid and replacing part or all of the cool fluid in the chamber with hot fluid. Since valve 7 can be driven by a synchronous motor, means are provided for operating valve 7 independently of properties of the fluid. Thus, means independent of properties of the fluid are provided for activating, or blocking flow in the heating and cooling circuits. If valve 7 is designed for "break before make" operation, there is a period of substantially no flow through the chamber occurring between the periods of adding fluid to the chamber.

Heating chamber 19 and cooling chamber 14 each serve as means for modifying the temperature of fluid drawn from the optical chamber and recirculated back to the optical chamber. Cyclic temperature modulation of fluid in chamber 2 occurs at relatively constant pressure since fluid in the chamber is relatively free to expand and contract out of or into the system via low impedance system conduits including inlet 1 and outlet 15, which act as means for venting the chamber to a source of fluid throughout the cycle regardless of whether valve 7 is activating the hot or cold circuit. Due to the finite impedances of the system conduits, the source of fluid beyond inlet 1, and the fluid exhaust, beyond outlet 15, the expansion and contraction of fluid is restricted to a finite degree, so that system pressure is only substantially constant rather than exactly constant. Also, pressure in chamber 2 tends to follow any changes in source and exhaust pressure, but any such changes are expected to be relatively small during a cycle of valve 7. On the other hand, conduits of the source and exhaust, as well as of the system, by virtue of their volume and low or at least finite, fluid impedance stabilize system pressure during heating and cooling by allowing the volume of fluid being heated or cooled in the heating or cooling circuits to vary by allowing it to expand out of or contract into the activated circuit. During the heating portion of the cycle, fluid temperature in optical chamber 2 increases. Because of the expansion of fluid out of the heating circuit during this portion of the cycle, there is a decrease in the concentration, i.e., density, or amount, of fluid in the optical chamber. The increase in temperature causes an increase in characteristic spectral radiant emission by a fluid substance or by substance in the fluid in optical chamber 2, even though there is a reduced concentration or density of the substance in the chamber since, for typical emission bands of interest the temperature effect on emission is considerably greater than the concentration effect. Simultaneously, as a result of its decreased concentration, and possibly to a slight extent due to its increased temperature, the fluid in optical chamber 2 provides a decrease in characteristic spectral absorption by the fluid or substance of the radiation from source 21, which radiation enters the optical chamber through optical window or filter 22. Radiant source 21 may be a pressure broadened or unbroadened arc lamp or spectral lamp or any other type of radiant source that has emission in the visible, ultraviolet, and/or infrared. As a result of the decrease in concentration of fluid in optical chamber 2 in response to the expansion of fluid from the heating circuit including the optical chamber, there is also a decrease in absorption by the fluid of the infrared radiation emitted by the walls and other peripheral components of optical chamber 2, as well as a decrease in absorption of radiation coupled into the optical chamber from a radiation monitoring system illustrated to the right of the optical chamber.

At relatively low concentrations, spectral absorption by a substance in the optical chamber in a characteristic band of the substance is typically a function mainly of the concentration or amount or density of the substance in the optical chamber and only a very minor function of the temperature of the substance. Although the fractional absorption of individual rotational lines of a typical molecular vibrational band may, according to the Maxwell-Boltzmann distribution law, vary significantly with temperature, the fractional absorption in the band as a whole, i.e., average or integrated over the various lines of the band, is relatively independent of temperature for temperature variations, for example, on the order of 200°C. This is essentially because the energy separation of the molecular vibrational quantum levels is typically much greater than the energy separation of the rotational levels. An example of a non-typical band, however, is a "hot band," wherein an increasing temperature causes a significant population of a molecular energy level, usually a vibrational level, close to but above a ground level, resulting in an increase in the absorption coefficient at wavelengths corresponding to infrared absorption by molecules at the higher level, and a decrease in absorption coefficient at wavelengths corresponding to infrared absorption by molecules at the ground level. This effect can occur or show up in other spectral regions also, such as in combination with electronic transitions which appear in the visible or ultraviolet. Generally, however, hot bands are relatively weak and are the exception rather than the rule. Typical absorption bands are much stronger and generally correspond to absorption by molecules at the zeroth or ground vibrational level. Sensitivity of monitoring a hot band can be increased by proper system design, e.g., by heating the fluid at constant volume, described elsewhere herein, by minimizing radiant emission from source 21 in the spectral interval of the hot band, or by omitting source 21. In the alternative, the monitoring of a hot band can be avoided in favor of one or more stronger bands of the same substance.

The fractional increase in band emission and typical substantially simultaneous fractional decrease in band absorption resulting from the activation of the heating circuit both cause an increase in spectral radiance in the chamber 2, whereby the two effects reinforce each other, rather than cancel each other as generally happens in prior art pump type analyzers. Correspondingly, during the cooling portion of the cycle, emission in a typical band decreases and absorption increases, as a result of the decreasing temperature and increasing concentration. The decreasing emission and increasing absorption both tend to decrease the spectral radiation intensity or radiance, in optical chamber 2, whereby these two spectral effects also reinforce each other.

In other words, in the present invention, temperature and concentration are modulated approximately 180°, or one-half cycle, out of phase with each other, causing characteristic spectral emission and absorption by a substance, which emission and absorption are also approximately 180° out of phase with each other. A spectral region of strong charactertistic absorption is typically also a region of strong characteristic emission. Since the characteristic modulated emission and absorption by a given substance are 180° out of phase but of opposite polarity, they cause characteristic spectral radiance variations which are substantially in phase with each other. Since, in a common spectral interval, the emission and absorption generally also are spectrally substantially identical to each other, they therefore augment or reinforce each other, in a numerically additive manner, to produce a net or resultant characteristic radiance variation which is larger than either one of them and substantially equal to their sum. In other words, they are additive not only according to the laws of vector addition but, more simply, they are additive substantially according to the laws of numerical addition.

In typical prior art analyzers of the pressure modulation type, however, temperature and concentration modulations are in phase, as are the emission and absorption variations. The opposite polarities of the emission and absorption variations, of the prior art, therefore result in spectral radiance variations that are about 180° out of phase, tending to cancel each other according to the laws of algebraic addition (they subtract), to thereby reduce sensitivity in a given spectral range.

This cancelling effect and resulting reduction in sensitivity is not severe in prior art pump type analyzers of the emission variety inasmuch as they do not use a hot radiant source emitting into the optical chamber and do not, therefore, have a modulated absorption signal which is large enough to severely cancel the much larger modulated emission signal. However, because of molecular thermal decomposition problems at the higher fluid temperatures, pump type emission analyzers cannot be used at the shortest infrared wavelengths, i.e., cannot cover the entire near infrared. On the other hand, in prior art pump type analyzers of the absorption variety, which do cover the near infrared, the cancelling effect and resulting reduction in sensitivity is severe in either the long wavelength portion of the near infrared or in the middle infrared (and can even reduce the sensitivity to zero at one wavelength, inasmuch as they do utilize a hot radiant source to produce a large modulated absorption. In the very near infrared this large modulated absorption is much stronger than the modulated emission and is not severely cancelled by it. However, at successively longer wavelengths in the near or middle infrared, the modulated absorption signal becomes weaker while the emission signal becomes stronger, whereby the cancelling effect increases and, as mentioned above, can even reduce the sensitivity to zero at one wavelength. It is desirable to avoid this cancelling effect because the near and middle infrared are very important regions of the spectrum for identifying molecules and monitoring their concentrations.

Some of the modulated radiance in optical chamber 2, which may be derived from modulated characteristic emission or absorption by a fluid, a substance within the fluid, or a substance on the wall of chamber 2 exits through optical window 23 and propagates through optical filters 24 and 25 to illuminate radiant detector flakes 26 and 27. The filters, detectors, and electronic monitoring system are similar to those described in my U.S. Pat. No. 3,516,745. Flakes 26 and 27 respond to the energy incident thereon to derive electrical signals having the same frequency and approximately the same phase as variations in spectral radiance in the optical chamber. The filter and detector pairs serve as part of an electro-optical spectral comparison network which responds to a spectral signature of a constituent of interest in the optical chamber. Output signals of detectors 26 and 27 are fed to a conventional electrical comparison circuit, such as a differential amplifier, a bridge, or a divider circuit, in electronics package 28, the components of which are not illustrated. The output of the comparison circuit contains a signal which is proportional to the amplitude of the spectral component of the radiance variation in chamber 2 which is characteristic of the substance of interest. This spectral component signal is applied to an electronic filter having a relatively wide band pass which reduces electronic or radiant noise components at frequencies much different from the fundamental frequency of the variation in spectral radiance, e.g., the frequency of rotary distributor valve 7. The output of this electronic filter is fed to an amplifier to derive a signal of a workable level. This amplified signal is fed to a synchronous rectifier which converts the amplified alternating output signal of the comparator and filter to a variable amplitude d.c. level that has an amplitude proportional to the a.c. amplitude of the signal input; the output of the synchronous rectifier is phase sensitive but is always driven at the same phase relative to the radiance variation in chamber 2 by means of phase information supplied by temperature sensor 29 in conduit 3. The phase is generally chosen for maximum d.c. output for an a.c. input signal at the expected phase. The synchronous rectifier output is fed to a conventional low pass electric filter, such as an RC smoothing filter, which further reduces noise and derives a d.c. signal indicative of the concentration or amount of a particular substance in chamber 2. The low pass filter can be responsive to the modulated radiance indicating output of the synchronous rectifier over a complete 360° cycle of the temperature variation. For certain situations, such as signal to noise improvement, it may be desirable to apply the rectified signal to the low pass filter during only a portion of the cycle, e.g., when the distributor valve 7 is blocking flow from both the hot and cold circuits to chamber 2 or only while the hot and cold circuits are activated. To these ends, the synchronous rectifier is supplied with a radiance indicating signal only during a certain phase interval(s) of the temperature signal derived by sensor 29, or the synchronous rectifier output can be gated to the low pass filter during the specified phase interval of the temperature signal.

Phase information for switching the synchronous rectifier at the proper frequency and phase is fed to package 28 from temperature sensor 29 located in common conduit 3. Sensor 29 monitors the cyclically varying temperature of fluid flowing from optical chamber 2 to pump 4 via conduit 3, which is common to both heating and cooling circuits, so that sensor 29, by monitoring a representative sample of fluid leaving optical chamber 2, essentially monitors the phase of temperature variations in the optical chamber. Sensor 29 could also be located in optical chamber 2. Sensor 29 derives a signal corresponding to the amplitude and phase of the temperature variation in the optical chamber, as well as the average temperature of the fluid in the optical chamber.

The temperature amplitude information can, if desired for greater accuracy of the d.c. output, be used to correct the output of the synchronous rectifier for changes in amplitude of the temperature variation. For example, the d.c. output could be divided by the amplitude of the temperature variation over a temperature modulation cycle by means of a ratio circuit. In the region of low concentration of a monitored substance, the amplitude of the d.c. output signal is linearly proportional to concentration or density of the substance or of the fluid containing the substance. At higher concentrations the output does not increase as rapidly as concentration; the non-linear relation at higher concentration can be corrected for or modified by calibration. The corrected output can be fed to any d.c. recording or indicating means, such as meter 30 in the FIGURE.

If the fluid source being monitored is not at atmospheric pressure and it is desired to reference the detected substance concentration to atmospheric or some other pressure, the pressure in optical chamber 2 can be monitored by optional sensor 31, which feeds a pressure indicating signal to electronic package 28. The d.c. component of the pressure indicating signal is obtained by electronic filtering and may be applied as a divisor input to a divider or ratio circuit responsive to the output of the synchronous rectifier. Relatively small amplitude pressure variations detected by sensor 31, which occur in response to activation of valve 7, can also be used, after suitable shaping, as an alternative synchronizing input to the synchronous detector. For even greater accuracy, to correct the system output so that it refers to either a fixed reference temperature or to temperature at the inlet, the signal indicative of average temperature of fluid in chamber 2, as derived from sensor 29, can be modified by either a fixed reference signal or a signal indicative of the average temperature of fluid being drawn into inlet 1, as detected by a temperature sensor (not shown) at the inlet. The modified signal is then used to automatically adjust the system gain to obtain the corrected output.

A second optical window 32 transmits spectral radiance from chamber 2 through a second filter pair and a second detector pair which converts the spectral radiance into electrical signals fed into package 28, similarly to the electro-optical components utilized for processing radiance leaving optical chamber 2 via window 23. The additional filter-detector pair can be used to monitor a band of a different substance or an additional band of the same substance to provide additional spectral comparison or spectral correlation information for increasing the versatility, specificity, or sensitivity, of the substance analyzer. The system can thus have multiple channels and can also have multiple outputs for providing information concerning multiple substances or to provide a confidence factor for one substance.

If it is desired to provide high frequency detectors or electronic circuits, or for other reasons, radiant source 21 or the outputs of windows 23 or 32 may be modulated, e.g., by chopping energy entering window 22 or exiting windows 23 or 32 with a rotating segmented wheel, or by varying the supply voltage for source 21 on a periodic basis, at a frequency different from the frequency of the gas temperature variation.

If the source 21 or the output of windows 23 or 32 is modulated at a different or second frequency, the final output would still be tuned by synchronous detection to the gas temperature variation. For example, the amplifier output(s) could first be synchronously or non-synchronously rectified and filtered at the frequency of the modulated radiant source or window output, in order to demodulate this second frequency. This rectified or demodulated signal would then be synchronously rectified again but at the frequency and phase of the gas temperature variation.

The inner walls of optical chamber 21 are preferably polished and coated with a material having high reflectivity in order to conserve radiation and increase the effective random optical path length, as mentioned in my U.S. Pat. No. 3,516,745. In general, the device is used to analyze fluid substances or substances in a fluid medium, e.g., gases, liquids, suspensions, aerosols, plasmas, or combinations thereof, but it can be used to monitor stationary substances. For example, if a solid substance being monitored is mounted in the optical chamber in fluid flow relation with the fluid passing through the chamber, rather than being a constituent of a fluid fed into the chamber, the substance, in general, produces a variation in spectral radiance in the chamber. The variation in characteristic spectral radiance occurs primarily because of the thermal cycling of the surface of the substance in response to the varying temperature and velocity of fluid flowing over the substance. Minute foreign substances, which can pass through an inlet filter (not shown) at inlet 1, may occasionally become attached to or coat the interior wall of the chamber. If such substance is an interferent rather than a substance of interest, the effect on radiance can be substantially avoided by proper selection of the characteristics of the optical filters responsive to energy propagated through the windows of chamber 2.

It is not necessary that the pressure in the optical chamber be exactly constant or even substantially constant in order to avoid the emission and absorption cancelling problem inherent in typical prior art pump type spectrometric analyzers. To avoid the cancelling effect it is only necessary that the concentration of compressible fluid in the optical chamber during the monitored high temperature portion of the cycle not be greater than the concentration during the monitored low temperature portion of the cycle, in order that radiant absorption not increase and decrease in phase with the radiant emission as in prior art analyzers. Thus the concentration can either remain constant or decrease as temperature is increased. If the concentration is held constant, whereby there is neither substantial cancelling nor reinforcement of the emission and absorption variations in a typical band, the fractional increase in pressure must be equal to the fractional increase in temperature, according to the ideal gas law. In typical prior art analyzers, the fractional increase in pressure is greater than the fractional increase in temperature, resulting in emission and absorption variations which are typically in phase and therefore produce radiance variations which are approximately one half cycle out of phase, and therefore tend to cancel each other. Thus, in the present invention, the pressure need only be relatively constant, rather than substantially or exactly constant, in order to avoid cancelling. If indeed the pressure is held substantially or exactly constant during heating and cooling of the fluid in the optical chamber, the concentration decreases as temperature is increased, producing an absorption variation which is approximately 180° (one half cycle) out of phase with the modulated emission, resulting not only in lack of mutual cancelling but in a mutual reinforcement of the two variations, whereby they are additive substantially according to the laws of numerical (as well as vectorial) addition. Since, in the present invention, fluid being heated and cooled in the heating and cooling circuits is allowed to respectively expand and contract during heating and cooling, the concentration does decrease and increase as fluid is heated and cooled. Thereby, there is a spectral reinforcement of absorption and emission, rather than a spectral cancelling thereof. The spectral reinforcement results in higher sensitivity over a broad spectral region, even though the pressure may only be relatively, rather than substantially or exactly, constant. This results essentially from the fact that the primal or causal means for modulating the fluid is thermal rather than pneumatic, in contrast with typical prior art analyzers utilizing pneumatic means as their primal means for modulating the characteristics of the fluid.

A variation of the present invention, which may be useful in monitoring certain substances, especially when monitoring a relatively long wavelength band where the emission signal is relatively large and important, involves cooling and heating the fluid in chamber 2 during portions of the cycle while maintaining the pressure constant and allowing the volume of the fluid to vary, and, during another portion of the cycle, heating the fluid at constant volume and increasing pressure. To this end, chamber 2 is periodically closed by rotatably driving ball valve 50 clockwise by connecting motor 5 through suitable gearing to valve 50, so that the ball valve 50 rotates at a frequency one half that of body 13 of valve 7. Valve 50 is located in inlet conduit 1 between optical chamber 2 and the inlet port of cooling chamber 14 into conduit 1.

Valve 50 closes inlet conduit 1 once each cycle of valve 7, with closure beginning approximately when the heating circuit is activated, so fluid being heated cannot expand out of optical chamber 2 toward inlet 1. Instead, fluid in chamber 2 is heated at constant colume and increasing pressure for a portion of the cycle. Since concentration is not reduced during heating except for slight leakage through valves 7 and 50, spectral emission of the fluid increases a greater amount than when fluid is heated at constant pressure without valve 50, for greater sensitivity in monitoring emission bands. Because of the relatively constant concentration, there typically is little change in absorption by the fluid of energy from source 21 during this period relative to the constant pressure cooling portion of the cycle, so that bands which are primarily absorption bands are generally not monitored during this constant volume heating portion of the cycle. After a predetermined portion (e.g., 50 percent) of the heating cycle has elapsed, valve 50 opens thereby relieving the pressure in optical chamber 2. Thereafter heating of the fluid in chamber 2 continues at constant reduced pressure, causing a drop in fluid concentration and, therefore, in absorption, which is therefore preferably monitored in the second segment of the heating portion of the cycle to increase sensitivity of monitoring bands which are primarily absorption bands.

Hot conduit 11 is provided with a widened portion 55 that extends to port 12 in valve 7 to lengthen the heating portion of the cycle and accommodate the two segments of the heating portion. Cut-out portion 8 of valve 7 may also be reduced in angular spread to decrease the cooling portion of the cycle. Bands which are primarily emission bands are preferably measured in the constant volume heating segment and in the cooling portion of the cycle. Bands which are primarily absorption bands (at shorter wavelengths) are preferably measured during heating and cooling at constant pressure. As a result of this modification, the cycle is thus divided essentially into three, rather than two, portions, with a smaller duty cycle for each of the three portions than for each of the two portions when valve 50 is excluded. Although sensitivity tends to be increased by the partially separate monitoring of emission and absorption bands using the three-segment cycle, the decreased duty cycle of the cycle portions tends to degrade sensitivity, and increase the system complexity. If there are no important absorption bands of a substance at shorter wavelengths, the portion of the cycle wherein the fluid is heated at a constant pressure can be substantially eliminated and the cycle can have essentially two portions, namely, heating at constant volume and cooling at constant pressure. The duty cycle of each portion is thereby increased. The synchronous rectifier output for either of these modifications is monitored as a function of the phase of the temperature signal derived by sensor 29, in a manner similar to that discussed supra.

It should be understood that pump 4 can be almost any means for inducing a flow of fluid in conduit 3, such as a blower, fan, or compressor. Rotary distributor valve 7, which is preferably motor driven, e.g., electrically driven, can have various designs, e.g., a spool valve or solenoid valve, or be another combination of valves functioning to modulate the temperature of the fluid in chamber 2. Fluidic oscillator techniques may be used to serve as a valve means in place of rotary valve 7. Other fluid circuitry may also be feasible for inducing a varying fluid temperature in the optical chamber at relatively constant pressure or at substantially constant volume. The particular radiant source 21 is optional and is not used if sufficient information regarding the substance can be derived solely in response to emission from the fluid. On the other hand, multiple spectral radiant sources, either unmodulated or modulated at the same or different frequencies or phases, can be utilized to provide additional selectivity, versatility, and sensitivity. Other electro-optical monitoring systems can be used, such as a filter wheel between radiant source 21 and optical chamber 2, or between optical window 23 and filter chambers 24 and 25, or between optical window 32 and its corresponding filters. Alternative means for sampling fluid may also be used. Collimated optics can be used if necessary in the monitoring system, or for focusing rays from the radiant source 21 onto optical window 22. If desired, to provide a modulated spectrometric source of known wavelengths, the device can be filled with a known gas and the inlet and outlet ports closed so that the known gas is sealed within the system and is alternately heated and cooled in the heating and cooling circuits to provide a temperature and concentration modulated source. In conjunction with a radiant source such as source 21, the device can serve as a broadband source of modulated spectral emission and modulated spectral absorption which are phased to reinforce each other in their common or borderline region where their amplitudes are of the same order of magnitude. The optical chamber containing the modulated gas or other fluid thus becomes a combination absorption and emission chamber of known characteristics. If the inlet and outlet are not blocked, and an external mixture is sampled, the chamber containing the modulated gas nevertheless serves as a combination emission and absorption chamber providing modulated spectral emission and absorption in the ultraviolet, visible, and infrared, wherein the emission and absorption modulations are approximately one half cycle out of phase and therefore do not cancel each other but rather reinforce each other in their common or borderline region in the infrared, for use in spectrometric analysis of gases or other substances.

Generally it is preferable that the volume and geometry of the random path optical chamber be constant or fixed in order to avoid a radiance variation in the chamber due to a variation in the optical characteristics of the chamber, e.g., reflectivity, emissivity, wall surface temperature, or randomization. Such a radiance variation could case a false output signal. While the FIGURE illustrates a square cross-section, it is to be understood that other shapes which provide random optical paths may be employed.

If all of the bands to be monitored are at sufficiently long wavelengths such that radiant emission by the substance and radiant emission into the optical chamber by the walls of the chamber are adequate for the desired sensitivity, radiant source 21 may not be required. The structure can also be used primarily as an absorption analyzer if the substance being analyzed has only short wavelength absorption bands of interest.

Phase information for synchronous detection can alternatively be provided by a sensor which senses the instantaneous angular position of body 13 of valve 7.

The frequency of operation of the device, i.e., the cyclical frequency of valve 7, can be selected from a broad range of frequencies. However, as frequency increases, heat transfer rate and pumping rate, as well as conduit impedance and volume, have a tendency to reduce the amplitude of the temperature variation of fluid in the optical chamber, which reduction tends to decrease sensitivity. The response time of radiation detectors, especially thermal type detectors, may also reduce system sensitivity as frequency increases. Also, high fluid flows necessary at high frequencies may increase thermal cycling of optical chamber components and may thus increase an undesirable radiance variation. On the other hand, as frequency decreases, or at d.c., low frequency noise, e.g., $1/f$ noise (where $f$ equals cyclic frequency), and drift tend to reduce sensitivity. Although low frequency noise can be circumvented by modulating the radiance variation at a higher frequency than the frequency of the fluid temperature variation, e.g., by a chopper, as discussed supra, such modulation generally makes the analyzer more complex. A compromise frequency should be selected which avoids severe high and low frequency problems. For these and other reasons, it is likely that the selected frequency for a typical system would be between 0.01 Hertz and 100 Hertz and that the frequencies between 3 Hertz and 30 Hertz appear to offer the best compromise.

While there has been described one specific embodiment of the invention with several modifications, it will be clear that other variations in the details of the embodiment and modifications specifically illustrated and described may be made without departing from the true spirit and scope of the invention as defined in the appended claims.

What is claimed is:

1. A spectrometric fluid analyzer comprising a substantially constant volume optical chamber, means for repeatedly: (1) during a first time interval, forcing a cool mass of a compressible fluid into the chamber while withdrawing a mass of the fluid from the chamber, and (2) thereafter, during a second time interval, forcing a heated mass of the fluid into the chamber while withdrawing a mass of the fluid from the chamber, said fluid being forced into and withdrawn from the chamber such that there is derived in the chamber a characteristic radiance variation which, in a typical absorption and emission band of the fluid, includes a modulated characteristic absorption of radiant energy by the fluid in the chamber and a modulated characteristic emission of radiant energy by the fluid in the chamber, said modulated emission and absorption in said band reinforcing each other to produce a resultant characteristic modulated radiance which is greater than either the modulated emission or the modulated absorption, and means for monitoring said characteristic radiance variation.

2. The analyzer of claim 1 wherein the resultant radiance is substantially equal to the sum of the emission and the absorption.

3. The analyzer of claim 1 wherein the means for forcing includes a heating circuit for: drawing fluid from the chamber, heating the drawn fluid, and returning the heated fluid to the chamber.

4. The analyzer of claim 3 wherein the means for forcing further includes a cooling circuit for: drawing fluid from the chamber, cooling the drawn fluid, and returning the cooled fluid to the chamber.

5. The analyzer of claim 1 wherein the means for forcing includes a motor driven rotary valve.

6. The analyzer of claim 1 further including means for reducing the flow of fluid through the chamber substantially to zero during a portion of the modulation cycle.

7. The analyzer of claim 3 wherein the means for heating includes a radiant source emitting radiant energy into the chamber to be absorbed by the fluid.

8. The device of claim 4 further including means for allowing the fluid being recirculated in the heating circuit to expand, and means for allowing the fluid being recirculated in the cooling circuit to contract.

9. The analyzer of claim 1 further including means for cyclically activating the means for forcing such that substantially all of the first and second time intervals are substantially independent of properties of the fluid in the chamber.

10. The analyzer of claim 1 wherein the means for forcing includes means for maintaining the pressure of the fluid at a substantially constant value for at least one half of the cycle.

11. The analyzer of claim 1 wherein the means for forcing includes: means for replacing, during the first time interval, most of the hot fluid in the chamber with cool fluid, and means for replacing, during the second time interval, most of the cool fluid in the chamber with hot fluid.

12. The analyzer of claim 1 wherein the heated fluid is provided primarily by a heating recirculation circuit.

13. The analyzer of claim 12 wherein the cool fluid is provided primarily by a cooling recirculation circuit, and further including valve means for alternately and repeatedly activating the cooling and heating circuits.

14. The analyzer of claim 13 including motor means for operating the valve means substantially independently of properties of the fluid.

15. The analyzer of claim 1 wherein the means for monitoring is synchronized with said means for forcing.

16. The analyzer of claim 1 wherein the monitoring means includes means for monitoring said resultant characteristic modulated radiance.

17. The analyzer of claim 16 wherein the monitoring means includes means for synchronously rectifying and filtering the monitored resultant radiance.

18. The analyzer of claim 7 wherein the means for forcing heated fluid includes transfer of waste heat from the source to the fluid.

19. The analyzer of claim 1 wherein the means for forcing includes a blower.

20. The analyzer of claim 1 wherein the means for forcing includes means for maintaining the pressure of the fluid in the chamber at a substantially constant value for substantially all of the modulation cycle.

21. A spectrometric fluid analyzer comprising an optical chamber, means for repeatedly, at substantially constant pressure throughout substantially all of a cycle: (1) during a first time interval of the cycle, forcing a cool mass of compressible fluid into the chamber while withdrawing a mass of the fluid from the chamber, and (2) thereafter, during a second time interval of the cycle, forcing a heated mass of the fluid into the chamber and withdrawing a mass of the fluid from the chamber, said fluid being forced into and withdrawn from the chamber such that there is derived in the chamber a cyclical radiance variation characteristic of a constituent of the fluid, and means for monitoring said characteristic variation.

22. The analyzer of claim 21 wherein the volume of the chamber is substantially constant.

23. The analyzer of claim 21 wherein the means for forcing includes a fluid recirculation and temperature modification circuit.

24. The analyzer of claim 23 wherein the means for forcing includes a motor driven valve operated independently of the properties of the fluid.

25. The analyzer of claim 23 wherein the circuit includes a heating means, a cooling means, and a valve means for alternately providing a fluid flow path through the heating means and the cooling means.

26. The analyzer of claim 21 wherein the means for forcing includes: means for replacing, during the first time interval, most of the hot fluid in the chamber with cool fluid, and means for replacing, during the second time interval, most of the cool fluid in the chamber with hot fluid.

27. The analyzer of claim 21 wherein the means for monitoring is synchronized with said variation.

28. The analyzer of claim 23 wherein the circuit includes a blower for forcing the fluid around the circuit.

29. The analyzer of claim 25 wherein the heating means primarily consists of heat transfer to the fluid from a radiant source.

30. The analyzer of claim 21 further including a radiant source emitting radiant energy into the chamber for augmenting the variation in radiant energy in the chamber.

31. A spectrometric substance analyzer comprising an optical chamber, means for cyclically modulating the temperature and concentration of a compressible fluid in the chamber such that the temperature and concentration modulations are substantially one half cycle out of phase, whereby the modulation produces a modulated radiance in the chamber characteristic of a substance in the chamber, and means for monitoring said modulated radiance.

32. The analyzer of claim 31 further including a radiant source emitting radiant energy into said chamber for augmenting the modulated radiance.

33. The analyzer of claim 31 further including a recirculation and temperature modification circuit including: a conduit means for carrying fluid from the chamber and returning said carried fluid to the chamber, means for inducing a flow of the fluid in the circuit, and means external to the chamber for modifying the temperature of fluid flowing in the circuit.

34. The analyzer of claim 33 wherein said circuit comprises a heating circuit and a cooling circuit, wherein said means for modifying includes both a means for heating fluid flowing in the heating circuit and a means for cooling fluid flowing in the cooling circuit, and valve means for repeatedly: (1) during a first time interval, allowing the flow of fluid in the cooling circuit while blocking flow of fluid in the heating circuit, and (2) during a second time interval, allowing fluid flow in the heating circuit while blocking fluid flow in the cooling circuit.

35. The analyzer of claim 31 wherein the chamber has a substantially fixed volume.

36. The analyzer of claim 32 wherein the temperature and concentration modulation means includes means for providing heat exchange between the source and the fluid.

37. The analyzer of claim 34 wherein said modulation means includes a motor driven rotary valve.

38. The analyzer of claim 34 wherein the valve means includes means for providing break before make operation.

39. The analyzer of claim 31 further including means for operating said modulation means at a frequency which is substantially independent of the properties of the fluid.

40. The analyzer of claim 37 wherein said temperature and concentration modulating means includes a blower.

41. The analyzer of claim 40 further including a radiant source emitting radiant energy into the chamber, said energy being cyclically absorbed by the substance in response to the modulation of the fluid.

42. The analyzer of claim 40 further including means for maintaining the pressure of the fluid at substantially the same value throughout substantially all of the cycle.

43. The analyzer of claim 40 including means for substantially equalizing the pressure of the fluid in the chamber and the pressure of a given source of fluid throughout substantially all of the cycle.

44. The analyzer of claim 40 including means for activating the valve means substantially independently of properties of the fluid.

45. The analyzer of claim 40 wherein the valve means includes means for blocking flow in both circuits during selected portions of each cycle.

46. The analyzer of claim 40 wherein the means for monitoring is synchronized with said modulated radiance.

47. The analyzer of claim 41 wherein heat energy for heating the drawn fluid is provided primarily by waste heat from the source.

48. A spectrometric fluid analyzer comprising an optical chamber, means for repeatedly (1) during a first time interval, heating the fluid at substantially constant volume in a volume which includes the chamber, whereby increased pressure results in the volume, and (2) thereafter, during a second time interval, relieving the increased pressure of the fluid in the chamber and (3) thereafter during a third time interval, cooling the fluid in the chamber at substantially constant pressure less than the increased pressure, means for repeating said intervals at a frequency and relative phasing which are each substantially independent of properties of the fluid, whereby a characteristic radiance variation is produced in said chamber in response to the presence of a substance in the chamber and the heating and cooling of the fluid, and means for monitoring said variation.

49. The device of claim 48 wherein the means for heating includes a recirculation heating circuit.

50. The analyzer of claim 48 wherein the means for monitoring is synchronized with said variation.

51. A spectrometric fluid analyzer comprising an optical chamber, means including valve means for cyclically modulating the temperature of a fluid in the chamber such that there is derived in the chamber a modulated radiance which is characteristic of a constituent of the fluid, said characteristic modulated radiance including, in a typical absorption and emission band of the constituent, a characteristic modulated absorption of radiant energy in the chamber by the constituent and a characteristic modulated radiant emission by the constituent, said emission and absorption being sufficiently out of phase so as to reinforce each other to produce in said band a resultant characteristic modulated radiance which is greater in amplitude than either the emission or the absorption in said band, means for monitoring said reinforced characteristic modulated radiance, and motor means for operating said valve means at a frequency which is substantially independent of the properties of the fluid.

52. The analyzer of claim 51 wherein the means for modulating includes a fluid recirculation and temperature modification circuit.

53. The analyzer of claim 51 wherein the optical chamber has a substantially constant volume.

54. The analyzer of claim 51 further including means for maintaining the pressure of the fluid substantially constant during most of the cycle.

55. The analyzer of claim 51 wherein the means for monitoring is synchronized with said modulated radiance.

56. The analyzer of claim 51 further including a radiant source emitting radiant energy into the chamber to increase the modulated absorption.

57. The analyzer of claim 56 wherein the means for modulating the fluid temperature includes means for transferring heat from the source to the fluid.

58. A spectrometric fluid analyzer comprising a substantially fixed geometry optical chamber, means for modulating the temperature of a fluid in the chamber such that there is derived a characteristic modulated radiance including a characteristic modulated absorption of radiant energy in the chamber by a substance in the chamber and a characteristic modulated emission of radiant energy by the substance in the chamber, said absorption and emission in a typical absorption and emission band of the substance being substantially one half cycle out of phase with each other, and means for monitoring said modulated radiance.

59. The analyzer fluid claim 58 wherein the means for modulating includes a fluid recirculation and temperature modification circuit.

60. The analyzer of claim 58 including means for maintaining the pressure of the fluid at a substantially constant value throughout substantially all of the cycle.

61. The analyzer of claim 58 wherein the means for monitoring is synchronized with said modulated radiance.

62. The analyzer of claim 58 further including a radiant source emitting radiant energy into the chamber for augmenting the modulated absorption.

63. The analyzer of claim 62 wherein the fluid temperature modulation means includes means for transferring heat from the source housing to the fluid.

64. The analyzer of claim 58 wherein the temperature modulation means includes an electric motor driven valve.

65. A spectrometric analyzer wherein a substance being analyzed has a cyclical effect on radiance comprising an optical chamber, means for cyclically modulating the temperature of a fluid in the chamber to obtain a modulated radiance in the chamber characteristic of said substance, said fluid being susceptible to contain or contact the substance in the chamber, said modulation means including: (a) a fluid flow recirculation heating circuit for drawing fluid from the chamber, heating the drawn fluid, and returning the heated fluid back to the chamber, (b) a fluid flow recirculation cooling circuit for drawing fluid from the chamber, cooling the drawn fluid, and returning the cooled fluid back to the chamber, and (c) means including valve means for repeatedly and alternately inducing the recirculation in the heating and cooling circuits; and means for monitoring said characteristic modulated radiance.

66. The analyzer of claim 65 wherein the means for inducing includes a blower.

67. In a spectrometric fluid analyzer, an optical chamber, means for alternately and cyclically circulating through the optical chamber hot and cool samples of the fluid, means for maintaining the pressure of the fluid in the chamber substantially constant throughout a substantial portion of the cycle, whereby there is derived in response to the alternate circulation a detectable cyclical radiance variation in the chamber characteristic of the fluid.

68. The analyzer of claim 67 further including means for maintaining the pressure of the fluid in the chamber substantially constant throughout substantially all of the cycle.

69. In a spectrometric substance analyzer, an optical chamber, means, including a fluid recirculation and temperature modification circuit and a motor driven valve activated at a rate substantially independent of the properties of the fluid, for alternately circulating hot and cool samples of a fluid through the optical chamber, whereby there is derived in response to the alternate circulation a detectable periodic radiance variation in the chamber characteristic of the fluid.

70. In an electro-optical gas analyzer, a substantially fixed geometry, substantially random path, optical chamber, means including valve means for repeatedly and alternately forcing hot and cool samples of the gas through the chamber, said valve means being activated at a rate substantially independent of the properties of the gas, whereby in response to said forcing, there is derived a detectable radiance variation in the chamber characteristic of a constituent of said gas.

* * * * *